US005587215A

United States Patent [19]

Bell

[11] Patent Number: 5,587,215

[45] Date of Patent: Dec. 24, 1996

[54] CALENDAR WRITING PAGE

[76] Inventor: Laurice A. G. Bell, P.O. Box 22122, Tucson, Ariz. 85734-2122

[21] Appl. No.: 305,582

[22] Filed: Sep. 14, 1994

[51] Int. Cl.[6] ...................................................... B32B 3/04

[52] U.S. Cl. ........................... 428/40.1; 283/2; 428/41.8; 428/42.1; 428/131; 428/137; 428/194; 428/220; 428/121; 428/124

[58] Field of Search .............................. 428/40, 131, 121, 428/137, 194, 220, 124; 283/2

[56] References Cited

U.S. PATENT DOCUMENTS 4,884,826 12/1989 Slagsvol .................................. 428/194

*Primary Examiner*—Nasser Ahmad

[57] ABSTRACT

The "Calendar Writing Page" consists of a piece of paper the size of the calendar with a strip of clear adhesive attached to and overlapping the paper. The overlapping adhesive strip has a peel away backing. The "writing page" covers the "calendar section" of the calendar and provides a clean writing area. The illustration from the calendar is used to generate writing responses. The clear adhesive gives a neat, clean edge to the book page. The hole punch marks allows the recycled calendar/book to line up uniformly and be bound with string, yarn, lace or any other binding apparatus.

1 Claim, 1 Drawing Sheet

CALENDAR WRITING PAGE

BACKGROUND OF THE INVENTION

1. Field of the Invention

The present invention relates to a set of writing pages to attach to previously existing calendar illustrations that allows the calendar to be recycled into a book.

2. Prior Art

Creative thinking, inductive reasoning and personal interactive hands-on-experience are highly sought after goals for educational activities at all age levels. Time and money have kept many educators, parents and childcare providers stuck with workbooks, basal readers and rote learning materials. They need a quick, easy, inexpensive way to help children improve their reading, writing and thinking skills. A "calendar writing page" allows them to create a beautiful book in minimal time using existing visuals from previously existing calendars.

SUMMARY OF THE INVENTION

The principal object of the present invention is to provide a device that recycles a previously existing calendar into a sturdy, one-of-a-kind book.

It is also the object of the present invention to provide a simple, quick, inexpensive way for parents, educators and childcare providers to challenge students to use create thinking and hands-on-experience to improve their writing and reading skills.

The foregoing objects can be accomplished by providing a set of "writing pages" that attach to a calendar's illustrations, line up uniformly with each other and that create a neat, professional, sturdy, one-of-a-kind book when bound.

DETAILED DESCRIPTION

Figure 1:
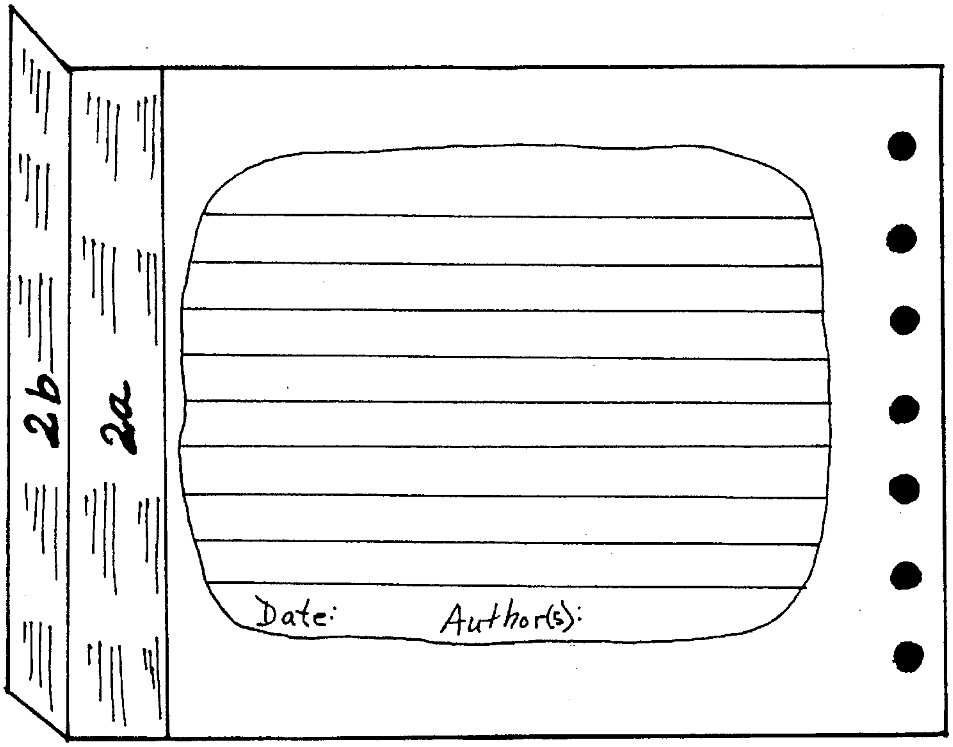
FIG. 1 is a frontal view of a "calendar writing page" in accordance with the present invention.

As shown in the drawing, the "writing page" includes a piece of paper (1) with a strip of clear adhesive (2) having a part (2*a*) attached to the left edge of the paper (1) and another part (2*b*) folded back and provided with a peel away backing adapted to adhere the "writing page" to a calendar page. The "writing page" has hole punch marks on the right edge, which allows the pictures to line up uniformly and to be bound with yarn, lace, string, etc., once they have been punched.

Figure 2:
FIG. 2 is a frontal view of a clear adhesive strip which binds the last calendar illustration with the back cover of the calendar.

One strip of clear adhesive (2), with a peel away backing, shown in FIG. 2, would be included to adhere the last calendar illustration to the back cover of the calendar/book.

The front cover of the calendar becomes the front cover of the book. A "writing page"(1) attached to the front cover begins the book. No other specific order need be followed with the monthly calendar illustrations. All illustrations from the calendar need not be used.

What is claimed is:

1. A set of "writing pages" for attachment to the monthly rectangular illustration sheets of a previously existing calendar, comprising:

(a) a plurality of rectangular pages of writing paper each of a size and shape corresponding to that of said illustration sheets;

(b) a corresponding plurality of clear adhesive strips each narrower than said writing paper pages and each having (i) a first portion aligned with and attached to the front surface of the left edge of one of said writing paper pages, said first portion having a longitudinal side edge that is aligned with and completely covering said left edge of said page and (ii) a second portion connected along its longitudinal side edge to said first portion side edge and extending beyond such left edge and having adhesive material on its bottom surface with a peel away backing attached thereto, said second portion being folded back along and behind said left edge to permit attachment to the front surface of one of said illustration sheets along its right edge with the back surface of said writing paper page exactly overlying the back surface of said illustration sheet; said second portion overlaps said first portion and said adhesive faces said first portion and, (c) markings along the right edge of each said writing paper page to identify hole punch areas for use in binding said writing paper pages and their associated illustration sheets along the edges thereof opposite to the edges attached to each other by said adhesive strips.

* * * * *